United States Patent
Schneider et al.

(10) Patent No.: US 10,831,571 B2
(45) Date of Patent: Nov. 10, 2020

(54) COMMUNICATING BETWEEN SYSTEMS USING A COUPLING FACILITY LIST STRUCTURE

(71) Applicant: INTERNATIONAL BUSINESS MACHINES CORPORATION, Armonk, NY (US)

(72) Inventors: Richard Schneider, San Jose, CA (US); Khiet Q. Nguyen, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/143,656

(22) Filed: Sep. 27, 2018

(65) Prior Publication Data
US 2020/0104197 A1   Apr. 2, 2020

(51) Int. Cl.
| | |
|---|---|
| *G06F 9/54* | (2006.01) |
| *G06F 11/30* | (2006.01) |
| *G06F 11/07* | (2006.01) |
| *G06F 16/22* | (2019.01) |
| *H04W 4/70* | (2018.01) |

(52) U.S. Cl.
CPC ............ *G06F 9/546* (2013.01); *G06F 9/542* (2013.01); *G06F 11/0709* (2013.01); *G06F 11/3055* (2013.01); *G06F 16/22* (2019.01); *H04W 4/70* (2018.02)

(58) Field of Classification Search
None
See application file for complete search history.

(56) References Cited

U.S. PATENT DOCUMENTS

| | | | |
|---|---|---|---|
| 6,266,783 B1 | 7/2001 | Allen et al. | |
| 6,944,787 B2 | 9/2005 | Allen et al. | |
| 8,156,177 B2 | 4/2012 | Bein et al. | |
| 8,195,704 B2 | 6/2012 | Kimmel et al. | |
| 8,661,296 B2 | 2/2014 | Bariska, Jr. et al. | |
| 8,799,522 B2 | 8/2014 | Elko et al. | |
| 2002/0087507 A1* | 7/2002 | Hopewell | G06F 9/546 |

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Charles E Anya
(74) *Attorney, Agent, or Firm* — Teddi Maranzano, Esq.; Blanche E. Schiller, Esq.; Heslin Rothernberg Farley & Mesiti P.C.

(57) ABSTRACT

Communication between one system and another system using one communication mechanism has failed. The one communication mechanism includes an operating system service to transfer a message between the one system and the other system. Based on determining that the communication between the one system and the other system has failed, automatically switching from the one communication mechanism to another communication mechanism to communicate the message between the one system and the other system. The other communication mechanism is different from the operating system service and uses a coupling facility list structure.

15 Claims, 8 Drawing Sheets

(56) References Cited

U.S. PATENT DOCUMENTS

| | | | | |
|---|---|---|---|---|
| 2003/0196016 A1* | 10/2003 | Brooks | ............... | G06F 11/2007 |
| | | | | 710/305 |
| 2006/0031251 A1* | 2/2006 | Blackman | ............... | G06F 16/25 |
| 2008/0168300 A1* | 7/2008 | Brooks | ............... | G06F 11/0709 |
| | | | | 714/2 |
| 2008/0228872 A1* | 9/2008 | Bock | ....................... | H04L 29/06 |
| | | | | 709/203 |
| 2013/0179553 A1* | 7/2013 | Elko | ................... | G06F 11/2097 |
| | | | | 709/223 |
| 2016/0164659 A1* | 6/2016 | Elko | ................... | G06F 11/2007 |
| | | | | 370/276 |

OTHER PUBLICATIONS

IBM, "z/Architecture—Principles of Operation," IBM Publication No. SA22-7832-11, Twelfth Edition, Sep. 2017, pp. 1-1902.

Nick, Jeffrey M. et al., "Overview of IBM System/390 Parallel Sysplex—A Commercial Parallel Processing System," Proceedings of International Conference on Parallel Processing, Apr. 1996, pp. 1-8.

* cited by examiner

```
┌─────────────────────────────────────────────────────────────────────┐
│  ┌───────────────────────────────────────────────────────────────┐  │
│  │ DETERMINE THAT COMMUNICATION BETWEEN ONE SYSTEM AND ANOTHER   │  │
│  │ SYSTEM USING ONE COMMUNICATION MECHANISM HAS FAILED ～400     │  │
│  │                                                               │  │
│  │    THE ONE COMMUNICATION MECHANISM INCLUDING AN OPERATING     │  │
│  │    SYSTEM SERVICE TO TRANSFER A MESSAGE BETWEEN THE ONE SYSTEM│  │
│  │    AND THE OTHER SYSTEM ～402                                 │  │
│  │                                                               │  │
│  │ AUTOMATICALLY SWITCH FROM THE ONE COMMUNICATION MECHANISM TO  │  │
│  │ ANOTHER COMMUNICATION MECHANISM, BASED ON DETERMINING THAT THE│  │
│  │ COMMUNICATION BETWEEN THE ONE SYSTEM AND THE OTHER SYSTEM HAS │  │
│  │ FAILED ～404                                                  │  │
│  │                                                               │  │
│  │    THE OTHER COMMUNICATION MECHANISM TO COMMUNICATE THE       │  │
│  │    MESSAGE BETWEEN THE ONE SYSTEM AND THE OTHER SYSTEM ～406  │  │
│  │                                                               │  │
│  │    THE OTHER COMMUNICATION MECHANISM BEING DIFFERENT FROM THE │  │
│  │    OPERATING SYSTEM SERVICE AND USING A COUPLING FACILITY LIST│  │
│  │    STRUCTURE ～408                                            │  │
│  └───────────────────────────────────────────────────────────────┘  │
│                                                                     │
│  ┌───────────────────────────────────────────────────────────────┐  │
│  │ THE ONE SYSTEM INCLUDES A FRONT-END SYSTEM INCLUDING A DATABASE│ │
│  │ SYSTEM OR A TRANSACTION PROCESSING SYSTEM, AND THE OTHER SYSTEM│ │
│  │ INCLUDES A BACK-END SYSTEM THAT PROCESSES MESSAGES OF THE     │  │
│  │ FRONT-END SYSTEM ～410                                        │  │
│  └───────────────────────────────────────────────────────────────┘  │
│                                                                     │
│  ┌───────────────────────────────────────────────────────────────┐  │
│  │ THE OPERATING SYSTEM SERVICE INCLUDES A CROSS-SYSTEM COUPLING │  │
│  │ FACILITY SERVICE, WHICH IS SEPARATE FROM THE COUPLING FACILITY│  │
│  │ LIST STRUCTURE ～412                                          │  │
│  └───────────────────────────────────────────────────────────────┘  │
│                                                                     │
│  ┌───────────────────────────────────────────────────────────────┐  │
│  │ DEFINE THE COUPLING FACILITY LIST STRUCTURE ～414             │  │
│  └───────────────────────────────────────────────────────────────┘  │
│                                                                     │
│  ┌───────────────────────────────────────────────────────────────┐  │
│  │ REGISTER AN INTEREST IN A QUEUE OF THE COUPLING FACILITY LIST │  │
│  │ STRUCTURE, THE QUEUE BEING SPECIFIC FOR THE ONE SYSTEM AND THE│  │
│  │ OTHER SYSTEM ～418                                            │  │
│  └───────────────────────────────────────────────────────────────┘  │
│ 416                                                                 │
└─────────────────────────────────────────────────────────────────────┘
```

FIG. 4A

THE AUTOMATICALLY SWITCHING INCLUDES:

QUEUING THE MESSAGE TO THE QUEUE —420

PROVIDING A NOTIFICATION OF THE QUEUING —422

THE MESSAGE IS SENT FROM THE ONE SYSTEM TO THE OTHER SYSTEM, AND THE PROVIDING NOTIFICATION INCLUDES INFORMING THE OTHER SYSTEM THAT THE MESSAGE IS QUEUED —424

THE COMMUNICATION OF THE MESSAGE BETWEEN THE ONE SYSTEM AND THE OTHER SYSTEM VIA THE OTHER COMMUNICATION MECHANISM IS PERFORMED:

ABSENT RETRYING SENDING THE MESSAGE VIA THE ONE COMMUNICATION MECHANISM —426

ABSENT ABORTING A WORK UNIT ASSOCIATED WITH THE MESSAGE —428

ABSENT TIMING OUT THE ONE SYSTEM OR THE OTHER SYSTEM —430

FIG. 4B

COMMUNICATING BETWEEN SYSTEMS USING A COUPLING FACILITY LIST STRUCTURE

BACKGROUND

One or more aspects relate, in general, to processing within a computing environment, and in particular, to facilitating communication between systems of the computing environment.

There are various types of computing environments, ranging from simple environments to more complex environments. A simple environment may include one processor executing one operating system, while a complex environment may include a plurality of processors or a plurality of isolated memory spaces executing various kinds of systems. In one example, a complex environment includes one or more logical partitions executing one or more operating systems and at least one logical partition executing coupling facility control code. Such an environment may be referred to as a system complex or a sysplex environment.

A sysplex environment, such as a z/Architecture sysplex environment, offered by International Business Machines Corporation, Armonk N.Y., includes systems that communicate with one another using Cross-System Coupling Facility (XCF) messaging. However, if the sending of a message between the systems using XCF fails, one or more of the systems are delayed, resulting in resources, which may be needed by other systems, being held.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes determining that communication between one system and another system using one communication mechanism has failed. The one communication mechanism includes an operating system service to transfer a message between the one system and the other system. Based on determining that the communication between the one system and the other system has failed, automatically switching from the one communication mechanism to another communication mechanism to communicate the message between the one system and the other system. The other communication mechanism is different from the operating system service and uses a coupling facility list structure.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 4A-4B depict one embodiment of facilitating processing within a computing environment, in accordance with an aspect of the present invention;

DETAILED DESCRIPTION

In accordance with an aspect of the present invention, communication between systems of a computing environment is facilitated. As one example, the computing environment is a sysplex environment that includes one or more front-end systems communicating with one or more back-end systems. A front-end system includes, for instance, a database system, such as the Information Management System (IMS), or a transaction processing system, such as the Customer Information Control System (CICS), both offered by International Business Machines Corporation, Armonk, N.Y. Further, a back-end system includes a system that processes messages of a front-end system. Although examples of front-end and back-end systems are provided, other types of systems may be used without departing from one or more aspects of the present invention.

Communication between the systems is performed using, for instance, an operating system service, such as the Cross-System Coupling Facility (XCF) offered by International Business Machines Corporation, Armonk, N.Y. The Cross-System Coupling Facility is a component of an operating system, such as z/OS, offered by International Business Machines Corporation, Armonk, N.Y., that manages communications between the systems. Despite the name Cross-System Coupling Facility, XCF is not a coupling facility, but part of an operating system running within, for instance, a logical partition. In contrast to an operating system, a coupling facility is comprised of coupling facility control code, rather than typical operating system code, and in one example, runs in a different logical partition than the operating system. A coupling facility is, for instance, a non-volatile shared storage device (e.g., hardware) having storage and processing capabilities that includes multiple storage structures, such as cache, list and/or lock structures.

In one example, the systems communicate with one another by sending messages using XCF. However, if the sending of a message between a front-end system and a back-end system using XCF fails, then the front-end system and/or the back-end system could wait, holding resources. To remove the wait, a timeout mechanism may be used, or a retry of the XCF send may be attempted, after waiting a predefined amount of time. However, the unit of work will be aborted, since the front-end and back-end systems are not able to synchronize, and the resources are held until the timeout or retry occurs.

Therefore, in accordance with an aspect of the present invention, instead of retrying the XCF send or using the timeout mechanism, the communication automatically switches from the one type of communication mechanism to another type of communication mechanism. For instance, communication automatically switches from the operating system service (e.g., XCF) to another communication mechanism that includes, for instance, the use of coupling facility list structures.

Figure 1:
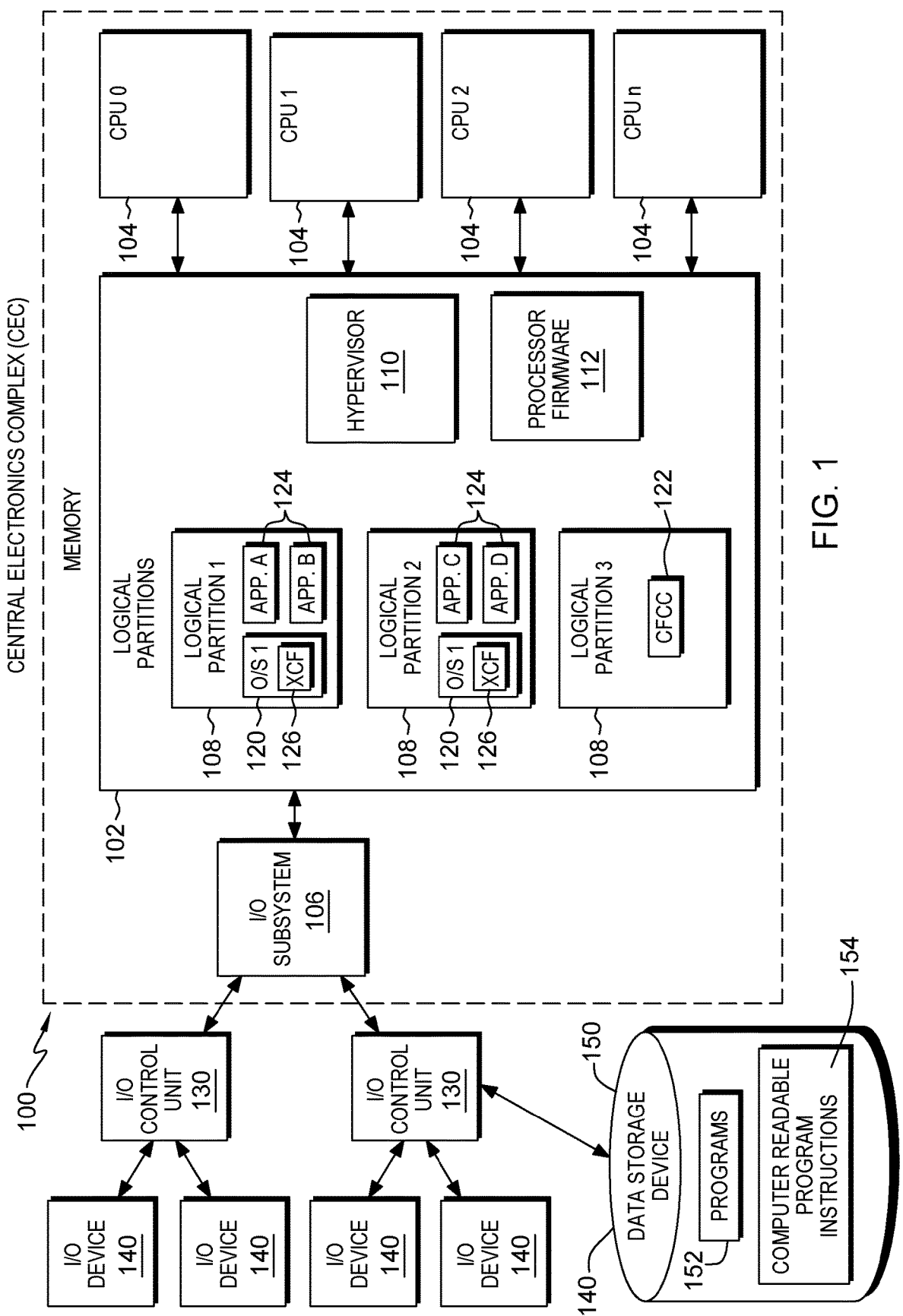
FIG. 1 depicts one example of a computing environment to incorporate and/or use one or more aspects of the present invention.

One embodiment of a computing environment to incorporate and use one or more aspects of the present invention is described with reference to FIG. 1. In one example, the computing environment is based on the z/Architecture offered by International Business Machines Corporation, and may include one or more servers, such as, one or more IBM Z servers, also offered by International Business Machines Corporation. One embodiment of the z/Architecture is described in an IBM publication entitled, "z/Architecture Principles of Operation," IBM Publication No. SA22-7832-11, 12$^{th}$ edition, September 2017, which is hereby incorporated herein by reference in its entirety. The z/Architecture, however, is only one example architecture.

In one example, the computing environment includes a central electronics complex (CEC) 100. CEC 100 includes a plurality of components, such as, for instance, a memory 102 (a.k.a., system memory, main memory, main storage, central storage, storage) coupled to one or more processors (a.k.a., central processing units (CPUs)) 104, and to an input/output subsystem 106.

Memory 102 includes, for example, one or more logical partitions 108, a hypervisor 110 that manages the logical partitions, and processor firmware 112. One example of hypervisor 110 is the Processor Resource/System Manager (PRISM), offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 108 is capable of functioning as a separate system. That is, each logical partition can be independently reset, run a guest operating system 120 such as z/OS, or other control code 122, such as coupling facility control code (CFCC), and operate with different programs 124. An operating system or application program running in a logical partition appears to have access to a full and complete system, but in reality, only a portion of it is available. In one example, operating system 120 includes a communication component 126, such as XCF, used to manage communications between applications in the CEC.

Memory 102 is coupled to processors (e.g., CPUs) 104, which are physical processor resources that may be allocated to the logical partitions. For instance, a logical partition 108 includes one or more logical processors, each of which represents all or a share of a physical processor resource 104 that may be dynamically allocated to the logical partition.

Further, memory 102 is coupled to I/O subsystem 106. I/O subsystem 106 may be a part of the central electronics complex or separate therefrom. It directs the flow of information between main storage 102 and input/output control units 130 and input/output (I/O) devices 140 coupled to the central electronics complex.

Many types of I/O devices may be used. One particular type is a data storage device 150. Data storage device 150 may store one or more programs 152, one or more computer readable program instructions 154, and/or data, etc. The computer readable program instructions may be configured to carry out functions of embodiments of aspects of the invention.

Central electronics complex 100 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 100. Examples include, but are not limited to: microcode, device drivers, redundant processing units, external disk drive arrays, RAID systems, tape drives, and data archival storage systems, etc.

Further, central electronics complex 100 may be operational with numerous other general purpose or special purpose computing system environments or configurations. Examples of well-known computing systems, environments, and/or configurations that may be suitable for use with central electronics complex 100 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As indicated herein, a logical partition that includes coupling facility control code is referred to herein as a coupling facility. A coupling facility includes multiple storage structures, such as cache, list and/or lock structures, each of which is described in further detail below.

As examples, cache structures allow high-performance sharing of frequently-referenced data; list structures enable users to share information organized as entries on a set of lists or queues; and lock structures allow users to create a customized set of locks and locking protocols for serializing user-defined resources, including list or cache structure data. Further details regarding a list structure are described with reference to FIG. 2.

Figure 2:
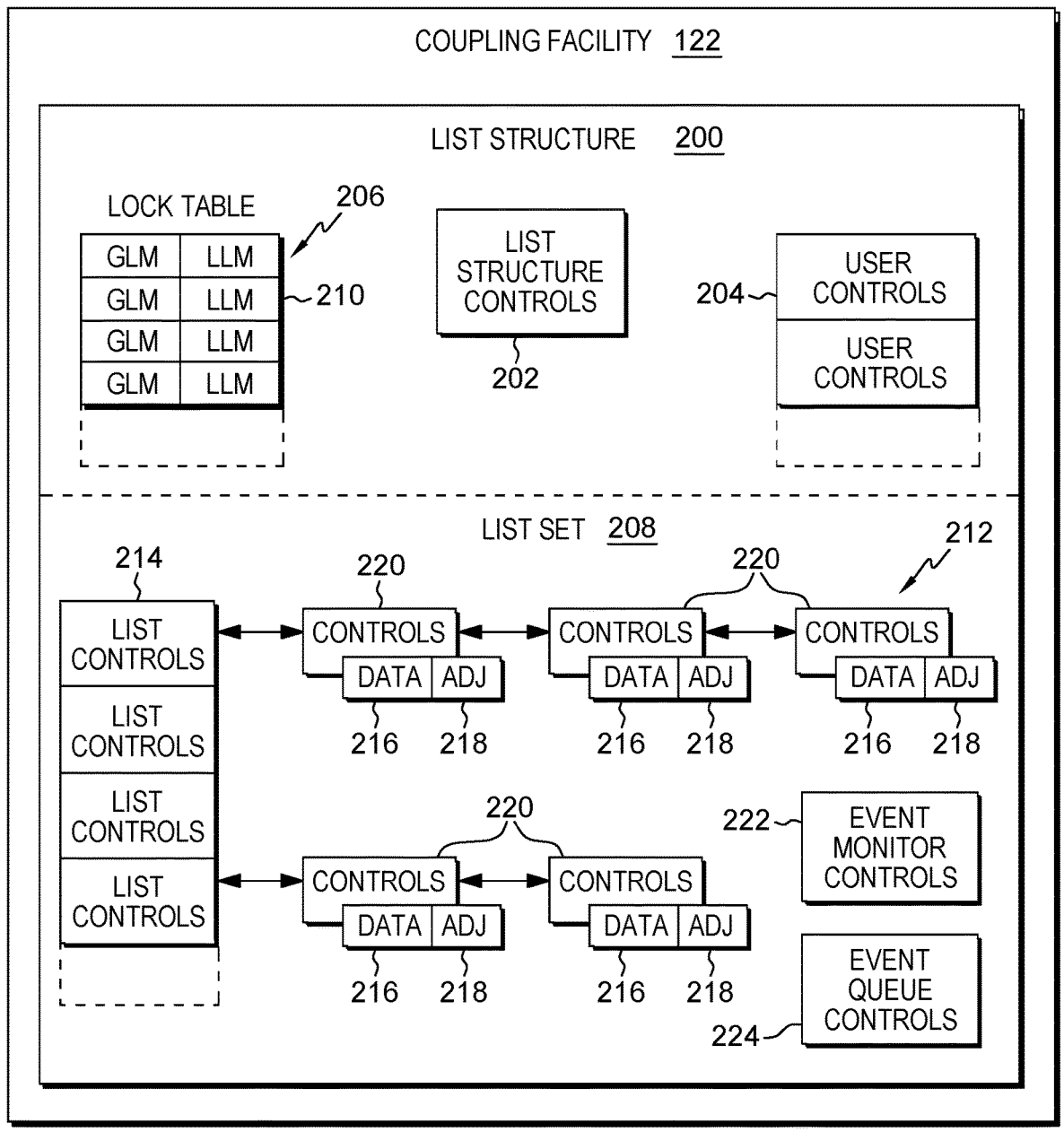
FIG. 2 depicts one example of a coupling facility of the computing environment of FIG. 1 that includes list structures used in accordance with an aspect of the present invention.

Referring to FIG. 2, a list structure 200 includes, for instance, list structure controls 202, user controls 204 and, optionally, a lock table 206 and/or a list set 208. (In other embodiments, the list structure may include other or additional components or information.)

List set 208 includes, for instance, one or more lists 212 represented by list control 214, which are, e.g., numbered consecutively, starting at zero. Each list 212 of list set 208 includes a sequence of zero or more entries. The list structure type determines whether the list entries have a data list entry 216, an adjunct list entry 218, or both. Associated with each entry of a list is list entry controls 220. Controls 220 include list entry location information and other information for controlling operations against data list entry 216. List set 208 also includes, in one example, event monitor controls 222 and event queue controls 224. In one example, there is an event monitor controls object for each user and subsidiary list combination for which a user has currently registered interest, and at least one event queue per user. Event monitor controls objects associated with a particular user and subsidiary list may be queued to, or withdrawn from, that user's event queue, in response to empty/non-empty state changes that occur for the subsidiary list with which the event monitor controls object is associated.

In accordance with an aspect of the present invention, a list structure is used as an alternative mechanism to communicate between the front-end and back-end systems, based on determining that XCF messaging is not working. One embodiment of using a list structure for communication is described with reference to FIG. 3.

Figure 3:
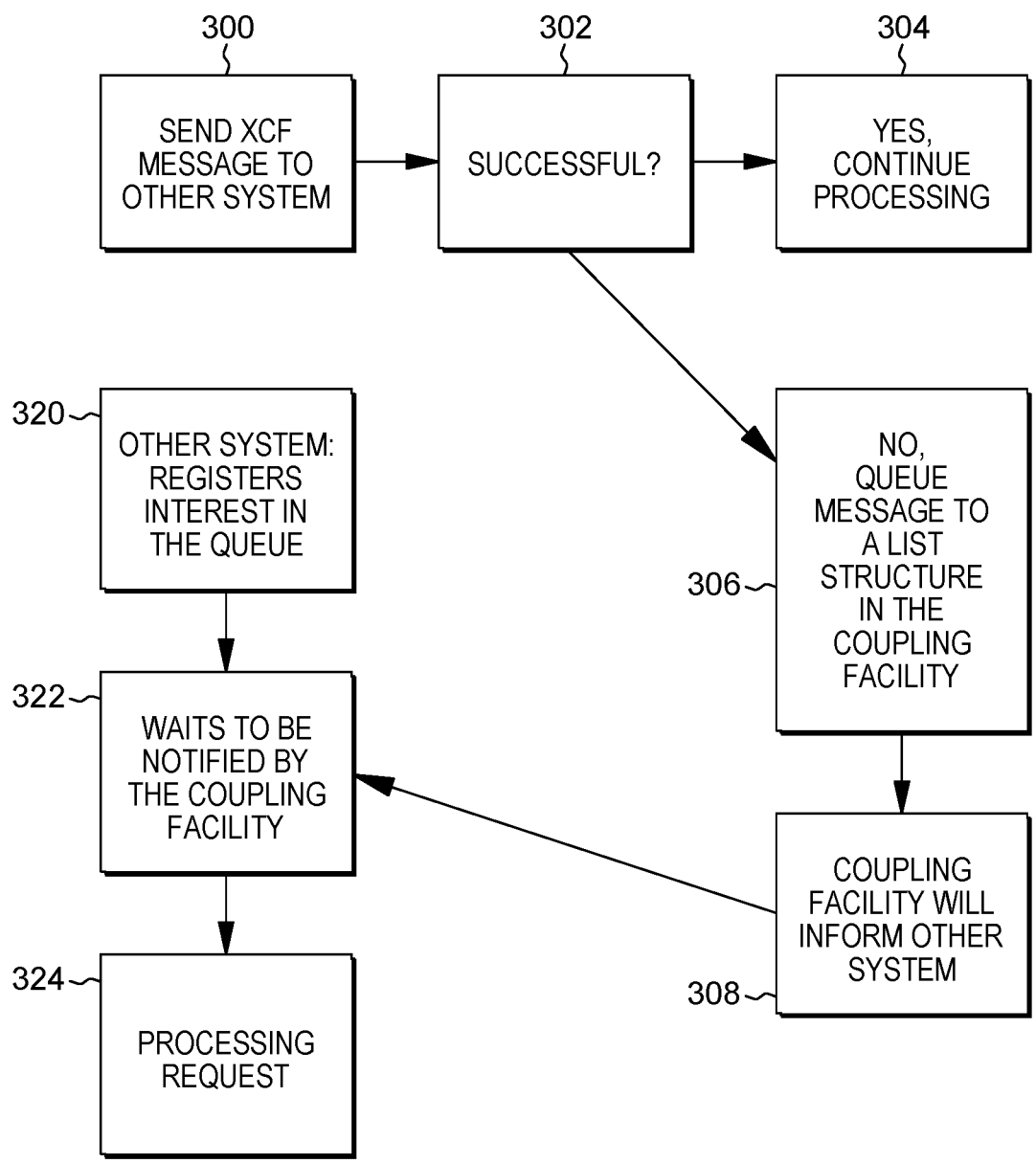
FIG. 3 depicts one example of using list structures in communication between systems, in accordance with an aspect of the present invention.

Referring to FIG. 3, initially, in one example, an XCF message is sent from one system (e.g., a front-end or back-end system) to another system (e.g., the other of the front-end or back-end system), STEP 300. If the message is successfully received, INQUIRY 302, then processing continues, as expected, STEP 304.

However, if it is determined that the message has not been successfully received, INQUIRY 302, then, in accordance with an aspect of the present invention, the message is queued to a list structure in the coupling facility, STEP 306. In one example, the queuing to the list structure (e.g., list structure 200) includes adding an entry (e.g., indicated by controls 220) to a list (e.g., list 212; also referred to herein as a queue) of a list set (e.g., list set 208) of the list structure. For instance, the message is included in a data entry (e.g., data entry 216) of the queue entry.

Further, the coupling facility (e.g., coupling facility 122) informs the other system of the queuing of the message, STEP 308. In one example, this is performed automatically when the queue transitions from no entries to entries, as described below. In one example, the informing is only performed for the first message queued for the front-end/back-end pair.

Asynchronously, the other system registers interest in the list or queue, STEP 320, and waits to be notified by the coupling facility, STEP 322. In one example, the other system registers interest in the queue using an operating system macro, such as IXLCONN. IXLCONN allows allocation and connection to a structure (e.g., list structure 200) in the coupling facility or connection to an already allocated structure. The first user to allocate the structure defines the structure attributes. Subsequent users can connect to the allocated structure but cannot change the structure attributes established when the structure was allocated. The connectors, whether the first or subsequent, are informed of the structure attributes through a connect answer area, mapped by IXLYCONA. It is the connector's responsibility to check the structure attributes to verify their acceptability.

The IXLCONN macro includes a plurality of parameters, including, for instance, a parameter that indicates when the structure is to be used for communication. This parameter is LISTTRANEXIT=listtranexit. This input parameter is used to identify the list transition exit for the requestor. The list transition exit is used to inform users when one or more lists or their event queue they are monitoring changes from the empty state to the non-empty state. This, in one example, is the notification that a message is on a list structure queue to be processed.

Based on being notified that the list structure includes a message, the other system processes the request, STEP 324. For instance, the system being informed of the message on the list structure obtains (e.g., retrieves, is provided, locates, receives) the message and processes the message, as in expected processing.

One or more aspects of the present invention are inextricably tied to computer technology and facilitate processing within a computer, improving performance thereof. Further details of one aspect of facilitating processing within a computing environment are described with reference to FIGS. 4A-4B.

Referring initially to FIG. 4A, in one aspect, a determination is made that communication between one system and another system using one communication mechanism has failed (400). The one communication mechanism includes an operating system service to transfer a message between the one system and the other system (402). Based on determining that the communication between the one system and the other system has failed, automatically switch from the one communication mechanism to another communication mechanism (404). The other communication mechanism is to communicate the message between the one system and the other system (406), and the other communication mechanism is different from the operating system service and uses a coupling facility list structure (408).

As examples, the one system includes a front-end system including a database system or a transaction processing system, and the other system includes a back-end system that processes messages of the front-end system (410). Further, in one example, the operating system service includes a cross-system coupling facility service, which is separate from the coupling facility list structure (412).

In one embodiment, the coupling facility list structure is defined (414), and an interest is registered in a queue of the coupling facility list structure (416). The queue is, in one example, specific for the one system and the other system (418).

Further, in one embodiment, referring to FIG. 4B, the automatically switching includes queuing the message to the queue (420), and providing a notification of the queuing (422). As an example, the message is sent from the one system to the other system, and the providing notification includes informing the other system that the message is queued (424).

Moreover, as examples, the communication of the message between the one system and the other system via the other communication mechanism is performed absent retrying sending the message via the one communication mechanism (426), absent aborting a work unit associated with the message (428), and/or absent timing out the one system or the other system (430).

As described herein, in one or more aspects, communication automatically switches from one communication mechanism (e.g., XCF) to another communication mechanism (e.g., using a coupling facility list structure), based on the one communication mechanism failing.

In one example, a list structure is defined, and the front-end and back-end systems register interest in the queue name specific for the front-end and back-end systems. A task listens for the specific queue name, does not hang-up the systems, and obtains the message from the queue.

The automatically switching allows the message to be delivered without retrying the send via XCF, without timing out, and without aborting the work unit. Therefore, processing within the computing environment is facilitated, improving performance, since, for instance, recovery procedures are not used, a timeout is not used, and the message need not be resent. Thus, the processor itself is improved.

Other variations and embodiments are possible.

Figure 5A:
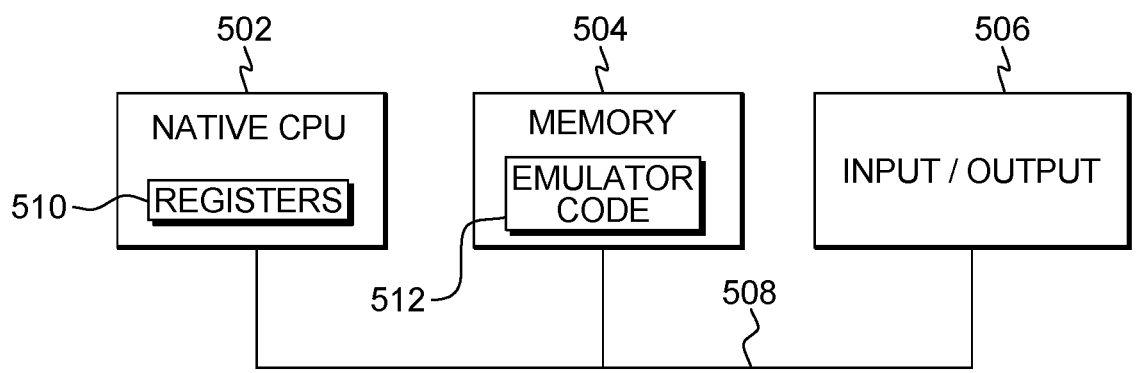
FIG. 5A depicts another embodiment of a computing environment to incorporate and/or use one or more aspects of the present invention.

Other types of computing environments may also incorporate and use one or more aspects of the present invention, including, but not limited to, emulation environments, an example of which is described with reference to FIG. 5A. In this example, a computing environment 500 includes, for instance, a native central processing unit (CPU) 502, a memory 504, and one or more input/output devices and/or interfaces 506 coupled to one another via, for example, one or more buses 508 and/or other connections. As examples, computing environment 500 may include a PowerPC processor offered by International Business Machines Corporation, Armonk, N.Y.; and/or other machines based on architectures offered by International Business Machines Corporation, Intel, or other companies.

Native central processing unit 502 includes one or more native registers 510, such as one or more general purpose registers and/or one or more special purpose registers used during processing within the environment. These registers include information that represents the state of the environment at any particular point in time.

Moreover, native central processing unit 502 executes instructions and code that are stored in memory 504. In one particular example, the central processing unit executes emulator code 512 stored in memory 504. This code enables the computing environment configured in one architecture to emulate another architecture. For instance, emulator code 512 allows machines based on architectures other than the z/Architecture, such as PowerPC processors, or other servers or processors, to emulate the z/Architecture and to execute software and instructions developed based on the z/Architecture.

Figure 5B:
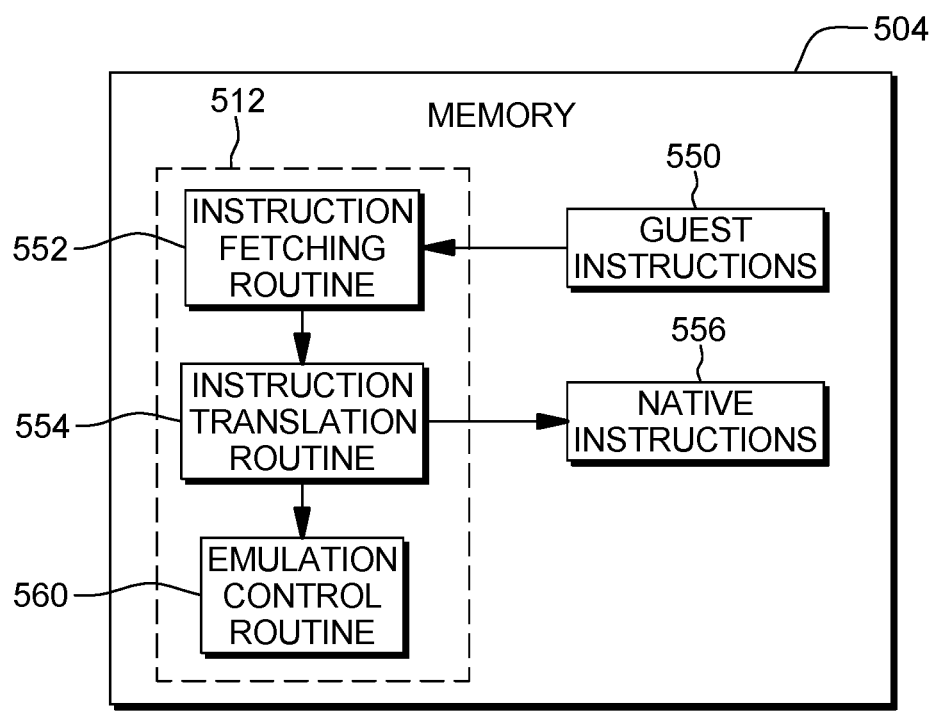
FIG. 5B depicts further details of the memory of the computing environment of FIG. 5A, in accordance with an aspect of the present invention.

Further details relating to emulator code 512 are described with reference to FIG. 5B. Guest instructions 550 stored in memory 504 comprise software instructions (e.g., correlating to machine instructions) that were developed to be executed in an architecture other than that of native CPU 502. For example, guest instructions 550 may have been designed to execute on a z/Architecture processor, but instead, are being emulated on native CPU 502, which may be, for example, an Intel processor. In one example, emulator code 512 includes an instruction fetching routine 552 to obtain one or more guest instructions 550 from memory 504, and to optionally provide local buffering for the instructions obtained. It also includes an instruction translation routine 554 to determine the type of guest instruction that has been obtained and to translate the guest instruction into one or more corresponding native instructions 556. This translation includes, for instance, identifying the function to be performed by the guest instruction and choosing the native instruction(s) to perform that function.

Further, emulator code 512 includes an emulation control routine 560 to cause the native instructions to be executed. Emulation control routine 560 may cause native CPU 502 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 556 may include loading data into a register from memory 504; storing data back to memory from a register; or performing some type of arithmetic or logic operation, as determined by the translation routine.

Each routine is, for instance, implemented in software, which is stored in memory and executed by native central processing unit 502. In other examples, one or more of the routines or operations are implemented in firmware, hardware, software or some combination thereof. The registers of the emulated processor may be emulated using registers 510 of the native CPU or by using locations in memory 504. In embodiments, guest instructions 550, native instructions 556 and emulator code 512 may reside in the same memory or may be disbursed among different memory devices.

A guest instruction 550 that is obtained, translated and executed may be, for instance, one of the instructions described herein. The instruction, which is of one architecture (e.g., the z/Architecture), is fetched from memory, translated and represented as a sequence of native instructions 556 of another architecture (e.g., PowerPC, Intel, etc.). These native instructions are then executed.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
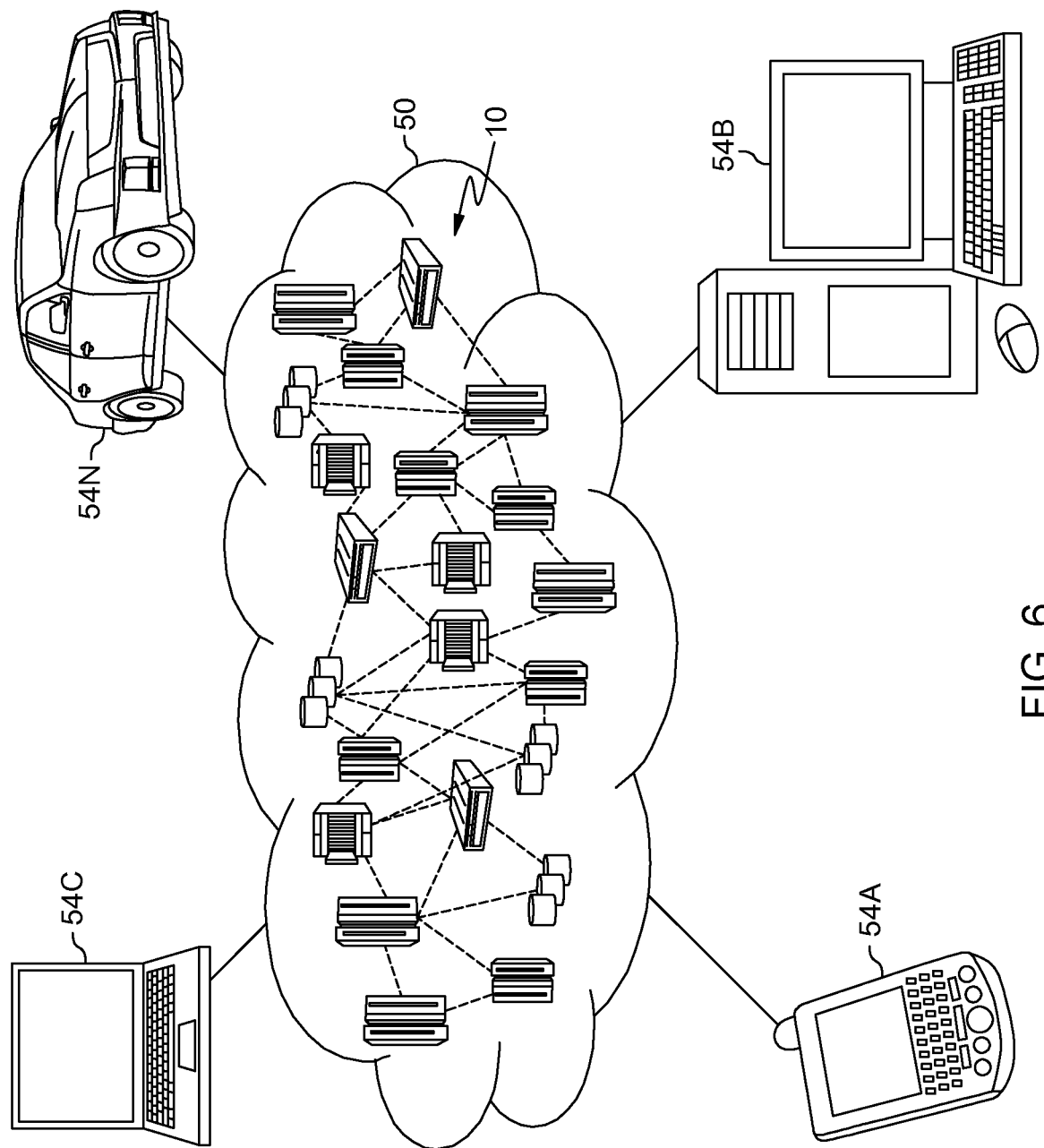
FIG. 6 depicts one embodiment of a cloud computing environment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
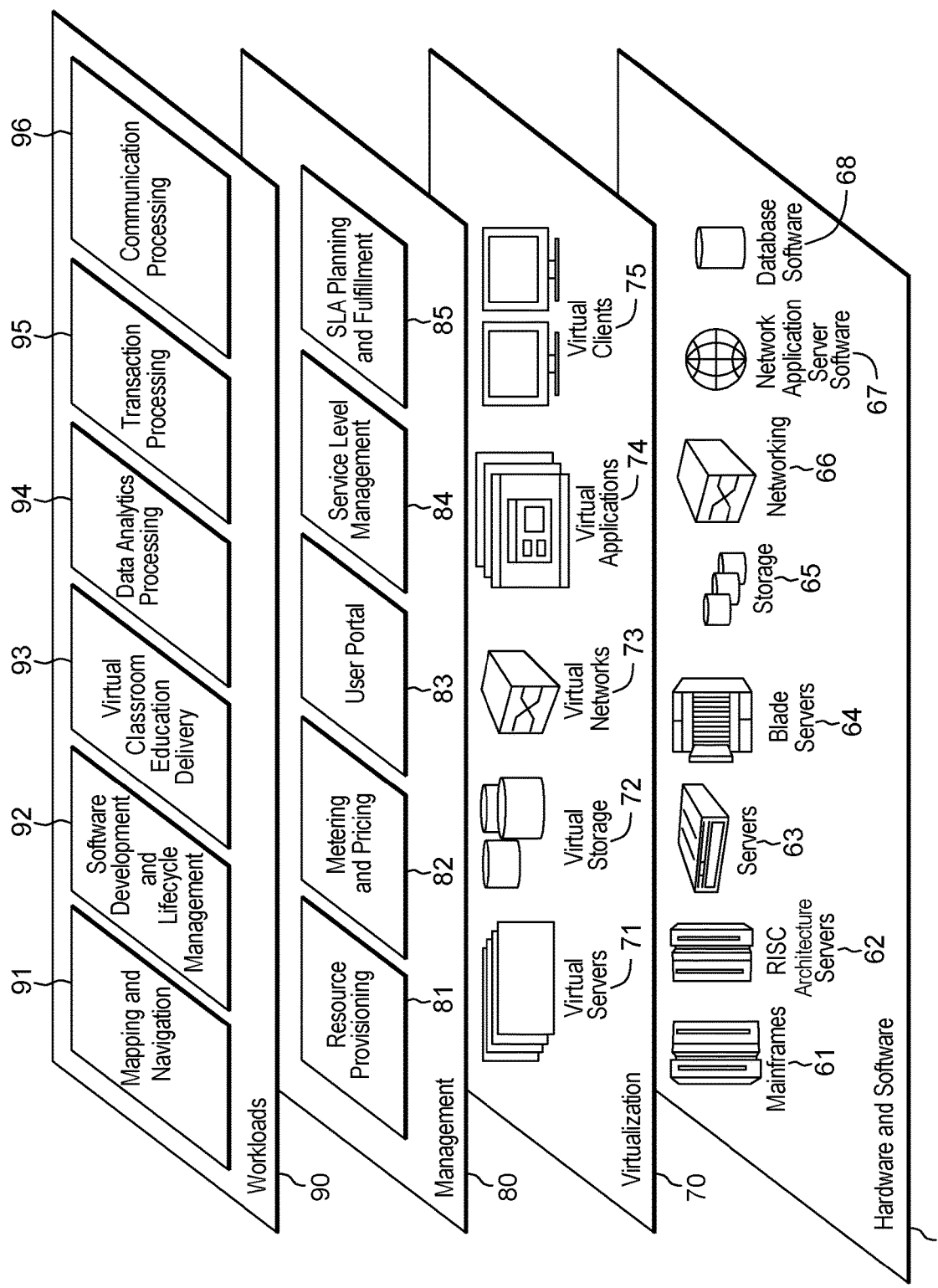
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different types of systems and different communications mechanisms may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer readable storage medium readable by at least one processing circuit and storing instructions for performing a method comprising:
      determining that communication between one system and another system using one type of communication mechanism has failed, wherein the one type of communication mechanism is an operating system service of an operating system to transfer a message between the one system and the other system, and wherein the operating system includes operating system code and resides in one logical partition; and
      automatically switching, based on determining that the communication between the one system and the other system has failed, from the one type of communication mechanism that is the operating system service of the operating system to another type of communication mechanism that is separate from the operating system service and the operating system, the other type of communication mechanism using a coupling facility comprising coupling facility control code, which is different than the operating system code, and executes in a different logical partition than the one logical partition in which the operating system code resides, wherein the other type of communication mechanism to communicate the message between the one system and the other system includes queuing the message to a coupling facility list structure of the coupling facility and informs the other system by the coupling facility that the message is queued, and wherein the automatically switching allows the message to be delivered absent retrying sending the message via the one type of communication mechanism, absent timing out the one system or the other system and absent aborting a work unit associated with the message.

2. The computer program product of claim 1, wherein the one system comprises a front-end system including a database system or a transaction processing system, and the other system comprises a back-end system that processes messages of the front-end system.

3. The computer program product of claim 1, wherein the operating system service includes a cross-system coupling facility service, which is separate from the coupling facility list structure.

4. The computer program product of claim 1, wherein the method further comprises defining the coupling facility list structure.

5. The computer program product of claim 1, wherein the method further comprises registering an interest in a queue of the coupling facility list structure, the queue being specific for the one system and the other system.

6. A computer system for facilitating processing within a computing environment, the computer system comprising:
   a memory; and
   a processor in communication with the memory, wherein the computer system is configured to perform a method, said method comprising:
      determining that communication between one system and another system using one type of communication mechanism has failed, wherein the one type of communication mechanism is an operating system service of an operating system to transfer a message between the one system and the other system, and wherein the operating system includes operating system code and resides in one logical partition; and
      automatically switching, based on determining that the communication between the one system and the other system has failed, from the one type of communication mechanism that is the operating system service of the operating system to another type of communication mechanism that is separate from the operating system service and the operating system, the other type of communication mechanism using a coupling facility comprising coupling facility control code, which is different than the operating system code, and executes in a different logical partition than the one logical partition in which the operating system code resides, wherein the other type of communication mechanism to communicate the message between the one system and the other system includes queuing the message to a coupling facility list structure of the coupling facility and informs the other system by the coupling facility that the message is queued, and wherein the automatically switching allows the message to be delivered absent retrying sending the message via the one type of communication mechanism, absent timing out the one system or the other system and absent aborting a work unit associated with the message.

7. The computer system of claim 6, wherein the operating system service includes a cross-system coupling facility service, which is separate from the coupling facility list structure.

8. The computer system of claim 6, wherein the method further comprises defining the coupling facility list structure.

9. The computer system of claim 6, wherein the method further comprises registering an interest in a queue of the coupling facility list structure, the queue being specific for the one system and the other system.

10. The computer system of claim 6, wherein the one system comprises a front-end system including a database system or a transaction processing system, and the other system comprises a back-end system that processes messages of the front-end system.

11. A computer-implemented method of facilitating processing within a computing environment, the computer-implemented method comprising:
   determining that communication between one system and another system using one type of communication mechanism has failed, wherein the one type of communication mechanism is an operating system service of an operating system to transfer a message between the one system and the other system, the operating system includes operating system code and resides in one logical partition; and automatically switching, based on determining that the communication between the one system and the other system has failed, from the one type of communication mechanism that is the operating system service of the operating system to another type of communication mechanism that is separate from the operating system service and the operating system, the other type of communication mechanism using a coupling facility comprising coupling facility control code, which is different than the operating system code, and executes in a different logical partition than the one logical partition in which the operating system code resides, wherein the other type of communication mechanism to communicate the message between the one system and the other system includes queuing the message to a coupling facility list structure of the coupling facility and informs the other system by the coupling facility that the message is queued, and wherein the automatically switching allows the message to be delivered absent retrying sending the message via the one type of communication mechanism, absent timing out the one system or the other system and absent aborting a work unit associated with the message.

12. The computer-implemented method of claim 11, wherein the operating system service includes a cross-system coupling facility service, which is separate from the coupling facility list structure.

13. The computer-implemented method of claim 11, wherein the method further comprises defining the coupling facility list structure.

14. The computer-implemented method of claim 11, wherein the method further comprises registering an interest in a queue of the coupling facility list structure, the queue being specific for the one system and the other system.

15. The computer-implemented method of claim 11, wherein the one system comprises a front-end system including a database system or a transaction processing system, and the other system comprises a back-end system that processes messages of the front-end system.

* * * * *